US012597621B2

(12) United States Patent
Draayer et al.

(10) Patent No.: US 12,597,621 B2
(45) Date of Patent: Apr. 7, 2026

(54) CLOSED LOOP CONTROL FOR FUEL CELL WATER MANAGEMENT

(71) Applicant: Hyster-Yale Group, Inc., Fairview, OR (US)

(72) Inventors: Nicholas M. Draayer, Portland, OR (US); Edmund Stilwell, Oregon City, OR (US); Eugene Wong, Berkeley, CA (US)

(73) Assignee: Hyster-Yale Group, Inc., Fairview, OR (US)

( * ) Notice: Subject to any disclaimer, the term of this patent is extended or adjusted under 35 U.S.C. 154(b) by 0 days.

(21) Appl. No.: 16/435,703

(22) Filed: Jun. 10, 2019

(65) Prior Publication Data

US 2019/0393526 A1    Dec. 26, 2019

Related U.S. Application Data

(60) Provisional application No. 62/688,991, filed on Jun. 22, 2018.

(51) Int. Cl.
H01M 8/04828    (2016.01)
H01M 8/04119    (2016.01)
(Continued)

(52) U.S. Cl.
CPC ..... H01M 8/04828 (2013.01); H01M 8/0432 (2013.01); H01M 8/04388 (2013.01); (Continued)

(58) Field of Classification Search
CPC .. H01M 8/04; H01M 8/04828; H01M 8/0432; H01M 8/04388; H01M 8/04395; H01M 8/04492; H01M 8/04552; H01M 8/04582; H01M 8/04634; H01M 8/04641; H01M 8/04753; H01M 8/04902; (Continued)

(56) References Cited

U.S. PATENT DOCUMENTS 7,099,787 B2    8/2006    Gasda et al.
7,687,164 B2    3/2010    Frost et al.
(Continued)

FOREIGN PATENT DOCUMENTS

CN    103098282 A    5/2013
CN    105742673 A    7/2016
(Continued)

OTHER PUBLICATIONS

European Search Report of European Application No. 19180516.7 dated Jun. 11, 2019 (8 pages).

*Primary Examiner* — Adam J Francis
(74) *Attorney, Agent, or Firm* — Finnegan, Henderson, Farabow, Garrett & Dunner, LLP

(57) ABSTRACT

A method for maintaining a target electrochemical impedance (ECI) for a fuel cell, which corresponds to a target hydration state for the fuel cell. The method includes determining a target electrochemical impedance (ECI) for the fuel cell based on current operating conditions. The method further includes determining actual ECI for the fuel cell and comparing actual ECI to the target ECI. The method further includes adjusting a cathode flow to the fuel cell based on a deviation of the actual ECI from the target ECI.

10 Claims, 10 Drawing Sheets

(51) Int. Cl.

| | |
|---|---|
| *H01M 8/0432* | (2016.01) |
| *H01M 8/0438* | (2016.01) |
| *H01M 8/04492* | (2016.01) |
| *H01M 8/04537* | (2016.01) |
| *H01M 8/04746* | (2016.01) |
| *H01M 8/04858* | (2016.01) |
| *H01M 8/04992* | (2016.01) |

(52) U.S. Cl.

CPC ... *H01M 8/04395* (2013.01); *H01M 8/04492* (2013.01); *H01M 8/04552* (2013.01); *H01M 8/04582* (2013.01); *H01M 8/04634* (2013.01); *H01M 8/04641* (2013.01); *H01M 8/04753* (2013.01); *H01M 8/04902* (2013.01); *H01M 8/04992* (2013.01); *H01M 8/04126* (2013.01)

(58) Field of Classification Search

CPC ......... H01M 8/04992; H01M 8/04126; H01M 8/0438; H01M 8/04179; H01M 8/04417; H01M 8/04559; H01M 8/04589; H01M 8/04951; H01M 8/04952; H01M 8/04858; H01M 8/04538; H01M 8/04119

See application file for complete search history.

(56) References Cited

U.S. PATENT DOCUMENTS

| | | | |
|---|---|---|---|
| 8,043,754 B2 | 10/2011 | Schneider et al. | |
| 8,603,689 B2 | 12/2013 | Manabe et al. | |
| 9,190,681 B2 | 11/2015 | Gottmann et al. | |
| 9,945,911 B2 | 4/2018 | Min et al. | |
| 2005/0287402 A1* | 12/2005 | Maly ................. | H01M 8/04649 |
| | | | 702/65 |
| 2009/0061263 A1 | 3/2009 | Watanabe | |
| 2009/0075127 A1 | 3/2009 | Lienkamp et al. | |
| 2013/0157158 A1* | 6/2013 | Kagami ............ | H01M 8/04634 |
| | | | 429/444 |
| 2014/0188414 A1 | 7/2014 | Jeong et al. | |
| 2014/0295302 A1* | 10/2014 | Ishikawa ........... | H01M 8/04388 |
| | | | 702/65 |
| 2016/0126566 A1* | 5/2016 | Iio ..................... | H01M 8/04776 |
| | | | 429/444 |
| 2016/0141690 A1 | 5/2016 | Imanishi et al. | |
| 2017/0077535 A1 | 3/2017 | Sudhan S et al. | |
| 2017/0170500 A1 | 6/2017 | Pi et al. | |
| 2018/0026280 A1* | 1/2018 | Hasegawa ......... | H01M 8/04544 |
| | | | 429/432 |
| 2018/0212262 A1* | 7/2018 | De Beer ........... | H01M 8/04649 |
| 2018/0269503 A1* | 9/2018 | Bowman ............. | H01M 8/0432 |
| 2019/0341638 A1* | 11/2019 | Kawabuchi ......... | H01M 8/0488 |

FOREIGN PATENT DOCUMENTS

| | | | | | |
|---|---|---|---|---|---|
| CN | 106104881 A | * | 11/2016 | ........ | H01M 8/04097 |
| CN | 106856244 A | | 6/2017 | | |
| CN | 207474582 U | | 6/2018 | | |
| EP | 3 038 199 A1 | | 6/2016 | | |
| EP | 2 750 231 B1 | | 10/2016 | | |
| GB | 2527584 A | * | 12/2015 | .......... | G01R 31/389 |
| JP | 2018014287 A | * | 1/2018 | | |
| WO | WO-2018131071 A1 | * | 7/2018 | ........ | H01M 8/04228 |

* cited by examiner

CLOSED LOOP CONTROL FOR FUEL CELL WATER MANAGEMENT

RELATED APPLICATIONS

This application claims the benefit of U.S. Provisional Application No. 62/688,991, filed Jun. 22, 2018, which is incorporated by reference in its entirety.

INTRODUCTION

The present disclosure relates to managing the hydration state of an electrochemical cell, and in particular a hydrogen fuel cell during operation and, more particularly, to systems and methods for managing the hydration state in a hydrogen fuel cell stack by measuring and using electrochemical impedance (ECI) of each cell in the fuel cell stack to optimize fuel cell performance.

BACKGROUND

A fuel cell system converts a fuel's chemical energy into electricity. For a hydrogen fuel cell a major byproduct is water. The water content in the fuel cell influences its performance and can be controlled, principally through a cathode flow system. While this disclosure pertains mainly to hydrogen fuel cells, its concepts may be applied to other suitable fuel cells and electrochemical cells.

A fuel cell stack consists of multiple fuel cells serially connected together. A hydrogen fuel cell includes a membrane-electrode assembly that contains an electrolyte membrane through which protons pass. Cathode and anode layers are formed on opposite sides of the electrolyte membrane, and are commonly formed as catalyst layers where fuel, such as hydrogen, and an oxidizer, such as oxygen, react with each other. Gas diffusion layers are formed on the surfaces of the cathode and anode. Separators with respective flow fields, through which fuel and oxidizer are supplied to the anode and the cathode, respectively, are positioned adjacent the gas diffusion layers. The components of a fuel cell stack are contained between two end plates to retain all the components within the stack.

For each fuel cell in a hydrogen fuel cell stack, hydrogen and oxygen are ionized through chemical reactions by the catalyst layers. An oxidation reaction occurs at the anode to generate hydrogen ions and electrons. The hydrogen ions migrate through the electrolyte membrane to the cathode while the electrons move to the cathode through a conductor. As a result of the hydrogen ions migrating through the electrolyte membrane to the cathode and movement of electrons to the cathode, a reduction reaction with oxygen ions at the cathode occurs which produces water and heat. The movement of the hydrogen ions also induces an electric current that flows in a wire.

The performance of a hydrogen fuel cell is influenced by the amount and distribution of water in the fuel cell. Too much water can cause a deterioration in performance, but so can too little due to drying out of the fuel cell. An extreme case of too much water can lead to flooding of the fuel cell, which renders the fuel cell unusable. Even short of flooding, poor management of water level will not only cause deterioration in performance, but likely reduce the useful life of the fuel cell. The electrochemical impedance (ECI) has been found to correlate well with a hydration state of a fuel cell, and more importantly with performance. This disclosure pertains to closed-loop dynamical systems that is configured to achieve a high degree of continuous control of the electrochemical impedance.

A typical industry practice would be to use an open loop control system to operate a PEM fuel cell. Fuel Cell open loop control systems would measure stack coolant temperature, ambient conditions, cathode flow, and stack current. From these measurements, the open loop system determines the necessary cathode flow as an estimate for water management. However, an open loop control system has no mechanism to verify the hydration state. Boskoski, Debenjak, and Boshkoska proposed a method to measure fuel cell real-time hydration state via Fast Electrochemical Impedance Spectroscopy (EIS). P. Boskoski, A. Debenjak, and B. Boshkoska, *Fast Electrochemical Impedance Spectroscopy*, Springer 2017. This method is less than optimal because it requires computationally intensive devices to perform the required high-speed measurements and calculations to determine the fuel cell layer full impedance spectrum, which are not practical for industrial fuel cell applications.

SUMMARY

In one aspect, the present disclosure is directed to a method of determining an electrochemical impedance (ECI) of a fuel cell. The method may include verifying stable operating conditions for the fuel cell, measuring a current output by the fuel cell and recording a first current value, measuring a voltage across the fuel cell and recording a first voltage value, perturbing the current output from the fuel cell, verifying the current output by the fuel cell and the voltage across the fuel cell have stabilized following the perturbing of the current, measuring the current output by the fuel cell and recording a second current value, measuring the voltage across the fuel cell and recording a second voltage value, and determining ECI of the fuel cell by dividing the difference between the first voltage value and second voltage value by the difference between the first current value and the second current value, wherein the ECI is an indicator for the hydration state of the fuel cell.

In some embodiments, the method may include repeating the steps of the method during operation of the fuel cell to monitor the hydration state of the fuel cell over time. In some embodiments, the operating conditions include a cathode flow rate through the fuel cell, an anode flow rate through the fuel cell, a temperature of the fuel cell, the current output by the fuel cell, and the voltage across the fuel cell. In some embodiments, verifying the operating conditions are stable includes verifying that a flow through the cathode is fluctuating less than or equal to about 7%, that an anode fuel pressure is fluctuating less than or equal to about 10%, that a fuel cell stack temperature is fluctuating less than or equal to about 0.2%, that the current output by the fuel cell is fluctuating less than or equal to about 5%, and that the voltage across the fuel cell is fluctuating less than or equal to about 1%. In some embodiments, perturbing the output from the fuel cell includes commanding a DC/DC converter connected to the fuel cell to change the current output of the fuel cell. In some embodiments, the ECI is a direct current impedance or the ECI is a single-frequency ECI. In some embodiments, the single-frequency ECI is at a frequency of greater than about 1000 Hz. In some embodiments, an envelope and a phase of the single-frequency ECI for the fuel cell is measured using an analog circuit connected to the fuel cell. In some embodiments, the fuel cell is one of a plurality of fuel cells making up a fuel cell stack.

In another aspect, the present disclosure is directed to a method of identifying a target electrochemical impedance (ECI) for a fuel cell, which corresponds to a target hydration state for the fuel cell. The method may include determining an ECI for the fuel cell across a range of cathode flow rates, determining a rate of change of the ECI across the cathode flow range, and identifying a target ECI for the fuel cell as the ECI at the point where the change in the rate of change of the ECI is a maximum.

In some embodiments, determining the ECI for the fuel cell across a range of cathode flow rates is done while maintaining a coolant temperature for the fuel cell and the current output from the fuel cell stable. In some embodiments, the method may further include generating a set of target ECI values by repeating the method over a range of currents and a range of coolant temperatures. In some embodiments, determining the ECI for the fuel cell at each cathode flow may include: verifying stable operating conditions for the fuel cell, measuring a current output by the fuel cell and recording a first current value, measuring a voltage across the fuel cell and recording a first voltage value, perturbing the current output from the fuel cell, verifying the current output by the fuel cell and the voltage across the fuel cell have stabilized following the perturbing of the current, measuring the current output by the fuel cell and recording a second current value, measuring the voltage across the fuel cell and recording a second voltage value, and determining ECI of the fuel cell by dividing the difference between the first voltage value and second voltage value by the difference between the first current value and the second current value.

In another aspect, the present disclosure is directed to a method for maintaining a target electrochemical impedance (ECI) for a fuel cell, which corresponds to a target hydration state for the fuel cell. The method may include determining a target electrochemical impedance (ECI) for the fuel cell based on current operating conditions, determining actual ECI for the fuel cell, comparing actual ECI to the target ECI, and adjusting a cathode flow to the fuel cell based on a deviation of the actual ECI from the target ECI.

In some embodiments, the operating conditions considered are the current output by the fuel cell and the coolant outlet of the fuel cell. In some embodiments, the method for determining the actual ECI for the fuel cell comprises: verifying stable operating conditions for the fuel cell, measuring a current output by the fuel cell and recording a first current value, measuring a voltage across the fuel cell and recording a first voltage value, perturbing the current output from the fuel cell, verifying the current output by the fuel cell and the voltage across the fuel cell have stabilized following the perturbing of the current, measuring the current output by the fuel cell and recording a second current value, measuring the voltage across the fuel cell and recording a second voltage value; and determining ECI of the fuel cell by dividing the difference between the first voltage value and second voltage value by the difference between the first current value and the second current value. In some embodiments, the method of determining a target ECI for the fuel cell comprises: determining an ECI for the fuel cell across a range of cathode flow rates, determining a rate of change of the ECI across the cathode flow range, and identifying a target ECI for the fuel cell as the ECI at the point where the change in the rate of change of the ECI is a maximum. In some embodiments, a controller is configured to determine the adjustment of the cathode flow to the fuel cell utilizing a closed loop control system, and wherein the closed loop control system includes a feedforward loop from a measurement of a current of the fuel cell to the cathode flow and a feedback loop to the cathode flow based on the actual ECI. In some embodiments, the feedback loop based on the actual ECI is configured to enhance the transient behavior of the closed loop control system. In some embodiments, the cathode flow and the target ECI will remain steady when the current of the fuel cell remains steady, thus providing quasi-linearization to facilitate utilizing a closed loop control system. In some embodiments, the controller is configured such that a transient response time for the cathode flow and the target ECI to a current change is adjustable based on the magnitude of the feedback loop. In some embodiments, the controller is configured to predict the transient behavior of the closed loop control system by utilizing a frequency domain and a time domain representation of the closed loop control system. In some embodiments, the frequency domain representation reflects that the relationship between the cathode flow and actual ECI is linear and time-invariant system when the current is constant. In some embodiments, the closed loop control system utilizes three measured system parameters that depend on the current of the fuel cell and at least three control parameters that the controller selects in order to achieve the objective of adjusting the actual ECI to the target ECI. In some embodiments, the control parameters are determined using a frequency domain representation of the closed loop control system. In some embodiments, the closed loop control system further includes a feedback loop to the current of the fuel cell from the ECI.

In another aspect, the present disclosure is directed to a fuel cell system. The fuel cell system may include a fuel cell, a current sensor, a cell voltage monitor, a temperature sensor, a cathode flow sensor, and an anode pressure sensor. The fuel cell system may further include an oxidizer system configured to supply a cathode flow to a cathode of the fuel cell, and a controller configured to: determine an electrochemical impedance (ECI) of the fuel cell, which is indicative of the hydration state of the fuel cell, identify a target ECI for the fuel cell, which corresponds to a target hydration state for the fuel cell, and adjust the cathode flow to the fuel cell based on a deviation of the ECI from the target ECI.

In some embodiments, the controller is configured to determine the adjustment of the cathode flow to the fuel cell utilizing a closed loop control system; and wherein the closed loop control system includes a feedforward loop from a measurement of a current of the fuel cell to the cathode flow and a feedback loop to the cathode flow based on the ECI. In some embodiments, the feedback loop based on the ECI is configured to enhance the transient behavior of the closed loop control system. In some embodiments, the cathode flow and the target ECI will remain steady when the current of the fuel cell remains steady. In some embodiments, the controller is configured such that a transient response time for the cathode flow and the target ECI to a current change is adjustable based on the magnitude of the feedback loop. In some embodiments, the controller is configured to predict the transient behavior of the closed loop control system by utilizing a frequency domain and a time domain representation of the closed loop control system. In some embodiments, the frequency domain representation reflects that the relationship between the cathode flow and ECI is linear and time-invariant system when the current is constant. In some embodiments, the closed loop control system utilizes three measured system parameters that depend on the current of the fuel cell and at least three control parameters that the controller selects in order to achieve the objective of adjusting the ECI to the target ECI.

In some embodiments, the control parameters are determined using a frequency domain representation of the closed loop control system. In some embodiments, the closed loop control system further includes a feedback loop to the current of the fuel cell from the ECI.

It is to be understood that both the foregoing general description and the following detailed description are exemplary and explanatory only and are not restrictive of the disclosure, as claimed.

The accompanying drawings, which are incorporated in and constitute a part of this specification, illustrate embodiments of the present disclosure and together with the description, serve to explain the principles of the disclosure.

DETAILED DESCRIPTION

Figure 1:
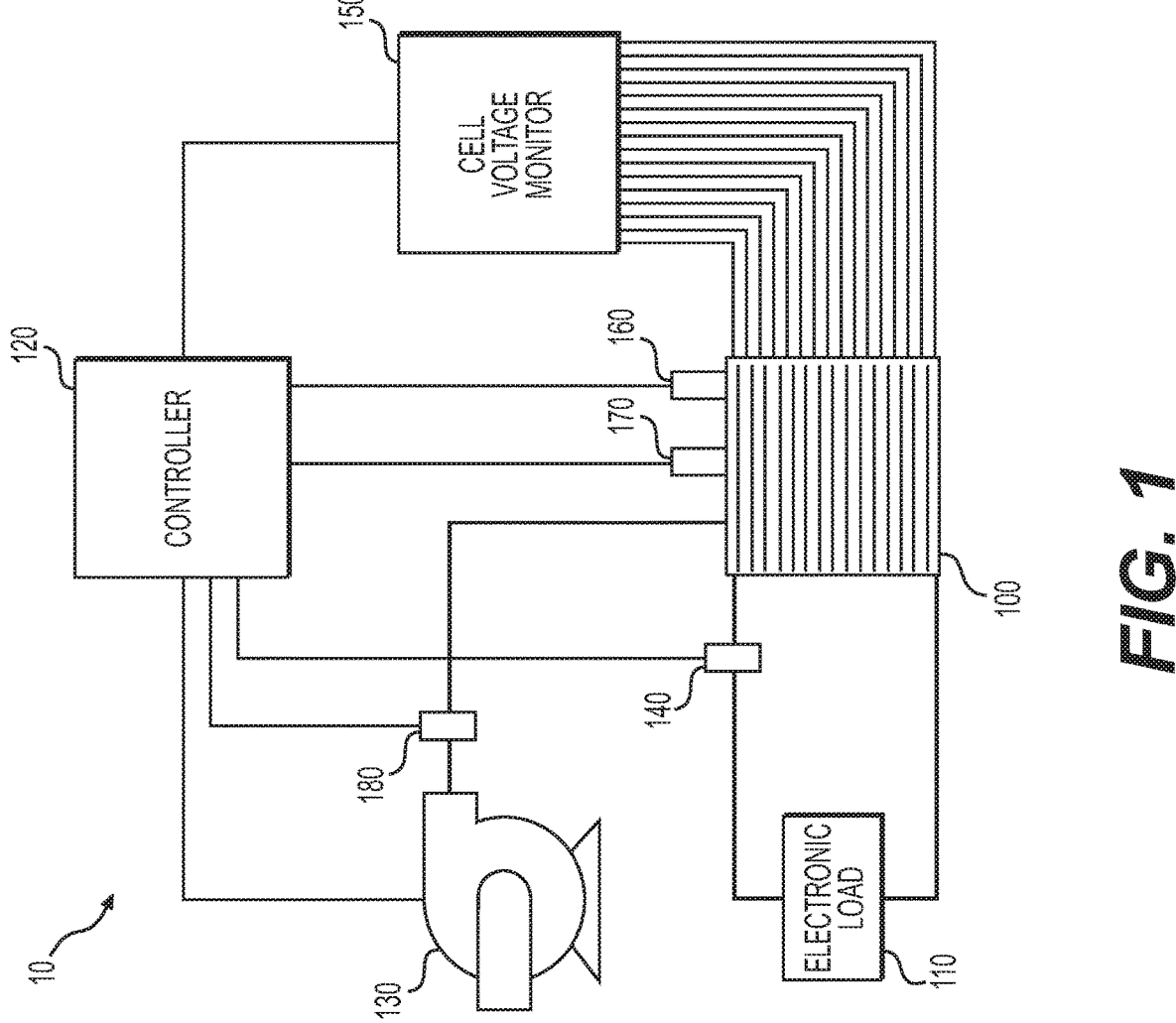
FIG. 1 is a schematic diagram of a fuel cell stack system, according to an exemplary embodiment.

FIG. 1 is a schematic diagram of a fuel cell stack system 10 configured to maintain a target hydration state for the fuel cell stack, according to exemplary embodiments. With reference to FIG. 1, system 10 may include a fuel cell stack 100 that provides electric current to an electronic load 110, and a current sensor 140 that detects the current provided to the electronic load 110 and sends a signal indicative of the current provided to the electronic load 110 to a controller 120. Optionally, a DC/DC converter may be included as a component of the electronic load. An oxidizer system 130 communicates with the controller 120 and provides an oxidizer to the cathode side of the fuel cell stack, for example, atmospheric air containing oxygen. In the example system, oxidizer system 130 may comprise an air mover, such as a fan or blower, fluidly communicating with fuel cell stack 100. A cell voltage monitor (CVM) 150 may monitor the voltage of each individual cell in fuel cell stack 100 and sends a signal indicative of each individual fuel cell voltage to controller 120. A temperature sensor 160 may detect the fuel cell coolant fluid temperature and sends a signal indicative of the coolant temperature to controller 120. A pressure sensor 170 may detect the fuel cell fuel pressure and sends a signal indicative of the fuel pressure to controller 120. In some embodiments, a flow sensor may be utilized in addition to or in place of pressure sensor 170 to detect the flow rate of fuel through the anode side of fuel cell stack 100. A cathode flow sensor 180 may detect the flow of the oxidizer through the cathode and sends a signal indicative of the flow to controller 120.

Although FIG. 1 and the present disclosure reference fuel cell stack 100, it is to be understood that the description is equally applicable to an individual fuel cell.

Figure 2:
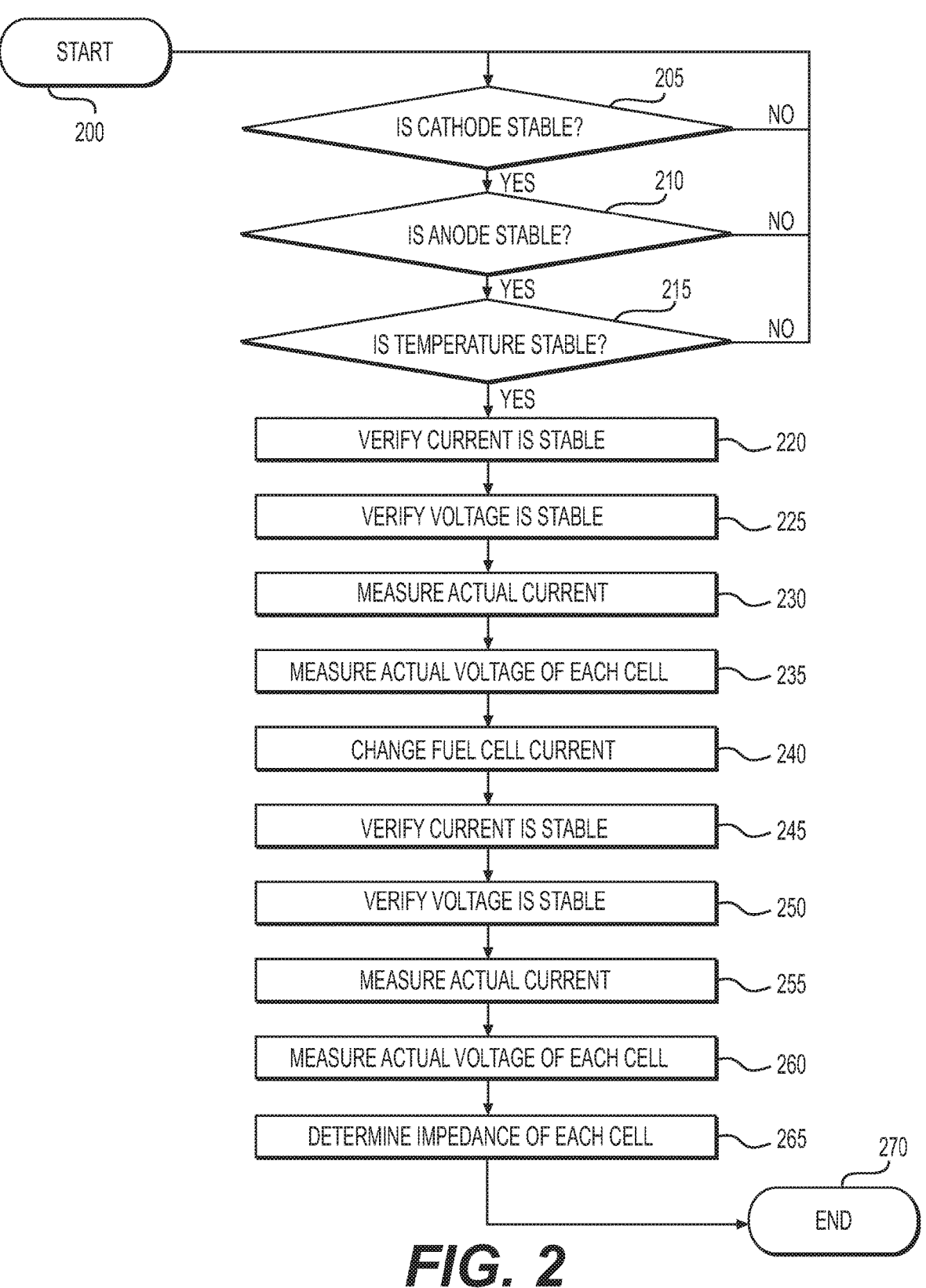
FIG. 2 is a flow chart of a method for determining the electrochemical impedance of a fuel cell, according to an exemplary embodiment.

With reference to FIGS. 2 and 3, an exemplary method for measuring the electrochemical impedance (ECI) of a fuel cell or fuel cells, for example of fuel cell stack 100, is illustrated. Optionally, in some embodiments, ECI may be the real (direct current) impedance. In some embodiments, ECI may comprise the real (direct current) and imaginary (alternating current) impedance. In some embodiments, ECI may comprise a single-frequency ECI, as will be discussed further herein.

As illustrated in FIG. 2, the method may begin with the activation or starting of fuel cell stack 100 (step 200). From step 200, controller 120 may begin monitoring the flow through the cathode side as measured by cathode flow sensor 180 and determine whether the flow is stable (step 205). Flow through the cathode may be considered stable when it is not fluctuating by more than a predetermined amount, for example, plus or minus about 20 standard liters per minute (slpm)/second for a flow of about 300 slpm, or approximately by plus or minus about 7% or less. If the cathode flow is not stable (step 205: no), controller 120 may return to step 205. If the cathode flow is stable (step 205: yes), controller 120 may proceed to step 210. At step 210, controller 120 may determine whether the pressure or flow of the anode fuel as measured by sensor 170 is stable. Pressure or flow of the anode fuel may be considered stable when it is not fluctuating by more than a predetermined amount, for example, plus or minus about 20 millibar (mbar) per second for about a 200 mbar anode fuel pressure, or approximately by plus or minus about 10% or less. If the anode pressure or flow is not stable (step 210: no), controller 120 may return to step 205. If the pressure or flow is stable (step 210: yes), controller 120 may proceed to step 215. At step 215, controller 120 may determine whether the temperature of the fuel cell stack 100 as measured by temperature sensor 160 is stable. The temperature of the fuel cell stack (coolant) may be considered stable when it is not fluctuating by more than a predetermined amount, for example, plus or minus about 0.1 degrees Celsius (° C.) per second for a temperature of approximately 55° C. to approximately 65° C., or approximately by plus or minus about 0.2% or less. If the temperature is not stable (step 215: no), controller 120 may return to step 205. If the flow is stable (step 215: yes), controller 120 may proceed to step 220. Steps 205, 210, and 215 operate such that, if one or more of the cathode flow, the anode pressure or flow, and the coolant temperature is not stable, controller 120 may delay determining the ECI of the cells in the fuel cell stack 100 until all are stable.

At step 220, controller 120 may delay until the current output by the fuel cell stack 100 as measured by sensor 140 is stable. The current may be considered stable when it is not fluctuating by more than a predetermined amount, for example, plus or minus about 2 amperes (A) per second for a current of approximately 40 A to approximately 125 A, or approximately by plus or minus about 5% or less. Once the current is stable, controller 120 may proceed to step 225. At step 225, the controller 120 may delay until the total voltage across the fuel cell stack 100 as measured by CVM 150 is stable. The voltage may be considered stable when it is not fluctuating by more than a predetermined amount, for example, plus or minus about 5 millivolts (mV) per second per cell averaged for all of the cells in fuel cell stack 100 for a current of approximately 500 mV to approximately 800 mV, or approximately plus or minus about 1% or less.

Figure 3A:
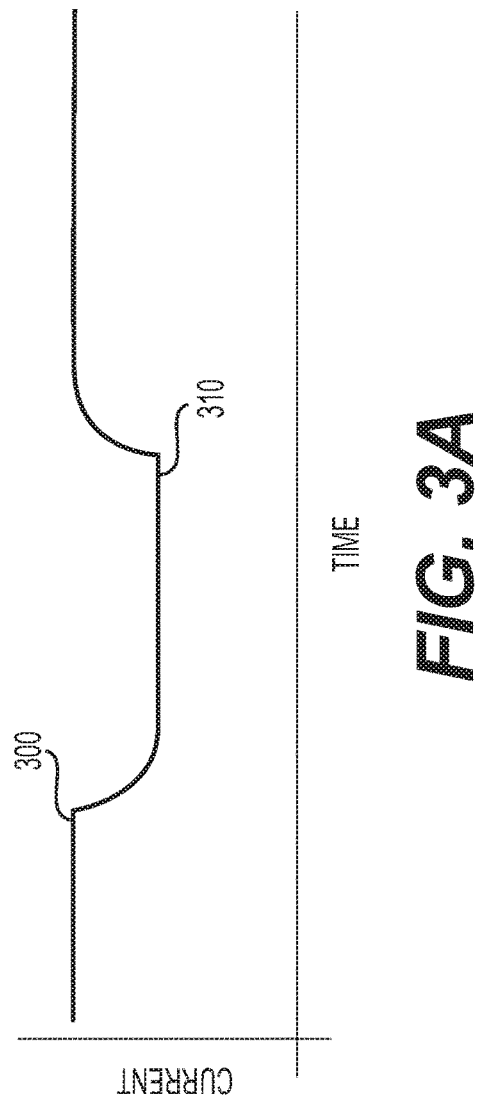
FIG. 3A is a plot of current vs. time for a fuel cell, according to an exemplary embodiment.
Figure 3B:
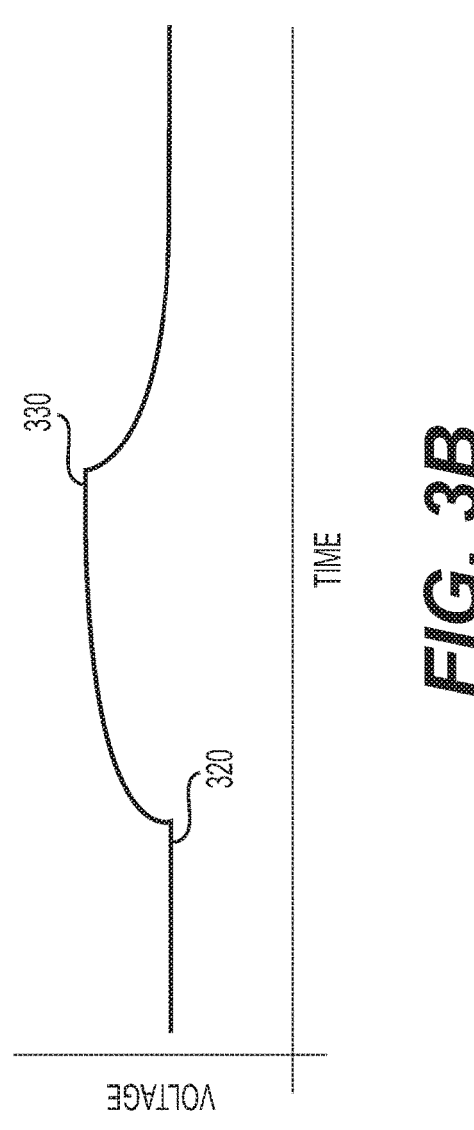
FIG. 3B is a plot of voltage vs. time for a fuel cell, according to an exemplary embodiment.

Once the voltage is stable, controller 120 may proceed to step 230. At step 230, controller 120 may read and record the current output by fuel cell stack 100 as measured by sensor 140, which may be represented by point 300 (FIG. 3A). At step 235, controller 120 may read and record the voltage across each cell in the fuel cell stack 100 as measured by CVM 150, which may be represented by point 320 (FIG. 3B).

At step 240, controller 120 may perturb the current through the fuel cell stack 100, for example, by commanding a DC/DC converter to change the current. Alternatively, the current may be changed by using a resistor and a relay connected across the fuel cell stack 100 in series and opening and closing the relay as needed, or by any other suitable manner. At step 245, controller 120 may delay until the current output by fuel cell stack 100 as measured by sensor 140 is stable. The current may be considered stable when it is not fluctuating by more than a predetermined amount, for example, approximately by plus or minus about 5% or less. Once the current is stable, controller 120 may proceed to step 250. At step 250, controller 120 may delay until the total voltage across fuel cell stack 100 as measured by CVM 150 is stable. The voltage may be considered stable when it is not fluctuating by more than a predetermined amount, for example, approximately by plus or minus about 1% or less.

At step 255, controller 120 can read and record the current output by fuel cell stack 100 as measured by sensor 140, which may be represented by point 310 (FIG. 3A). At step 260, controller 120 can read and record the voltage across each cell in the fuel cell stack 100 as measured by CVM 150, which may be represented by point 330 (FIG. 3B).

At step 265, controller 120 may determine the electrochemical impedance (ECI) of each cell in fuel cell stack 100. For example, controller 120 may divide the difference of each cell's voltage between point 320 and 330 by the cell's current difference between point 300 and 310, which will provide the ECI for each cell in fuel cell stack 100. The process can then be repeated for as long as fuel cell stack 100 is generating current in order to continue monitoring the ECI of the fuel cell stack 100.

In some embodiments, rather than a direct current (DC) ECI, a single-frequency ECI may be utilized, which can provide some advantages over DC-ECI. For example, single frequency ECI at higher frequencies (e.g., greater than about 1000 Hz), can yield faster measurement than DC-ECI. In addition, single-frequency ECI may provide more information than DC-ECI. For example, single-frequency ECI provides two values, envelope and phase, whereas DC-ECI provides a single value. In some embodiments, the phase may be used to instantaneously resolve uncertainty that may arise between a "too wet" and "too dry" state, whereas further measurement over some period of time may be required for DC-ECI.

Implementation of single-frequency ECI will first be described with respect to a single-cell fuel cell for simplicity. The current from the fuel cell at time t may be denoted as i(t), which may be represented by equation (1) below:

$$i(t)=I(t)+i_0\cos(2\pi f_0 t) \tag{1}$$

where I(t) denotes the load current, $i_0$ denotes the amplitude of a small sinusoidal probe current, and $f_0$ denotes the frequency of the sinusoid measured in Hz. The voltage across the cell at time t may be denoted as v(t). The voltage, v(t), may have a sinusoidal component at frequency $f_0$, so v(t) may be represented by equation (2) below:

$$v(t)=V(t)+v_0\cos(2\pi f_0 t+\varphi) \tag{2}$$

To make equation (2) more precise, the sinusoidal component may be defined empirically as the output of a narrow band filter with a small bandwidth (e.g., −20 db at 1%) compared to the frequency $f_0$. Neither $v_0$ nor $\varphi$ is a constant in reality, but are both slowly varying functions of t (i.e., $v_0(t)$ and $\varphi(t)$). Thus, the single-frequency electrochemical impedance (ECI) z(t) of the fuel cell at frequency $f_0$ may be represented by equation (3) below:

$$z(t)=A(t)e^{i\varphi(t)} \tag{3}$$

where $A(t)=(v_0(t)/i_0)$ is known as the envelope of z(t), and $\varphi(t)$ as its phase. Both the envelope and phase of the ECI can be measured, simply and quickly, for example, by using analog circuits commonly found in radio and signal processing technologies.

Although this technique of single-frequency ECI is explained for a single-cell fuel cell, it may be utilized for a fuel cell stack comprising a plurality of cells. In some embodiments, parallel measurement of the current and voltage of each cell may be utilized. However, for fuel cell stacks with a large number of cells this may not be a practical or a cost-effective approach. There are several options to address these potential drawbacks. For example, multiplexing of the voltages of individual cells may be performed. In some embodiments, the cells may be divided into groups and sampling among the groups may be performed. In some embodiments, time division multiplexing with some parallel channels of measurement may also be utilized.

Figure 4:
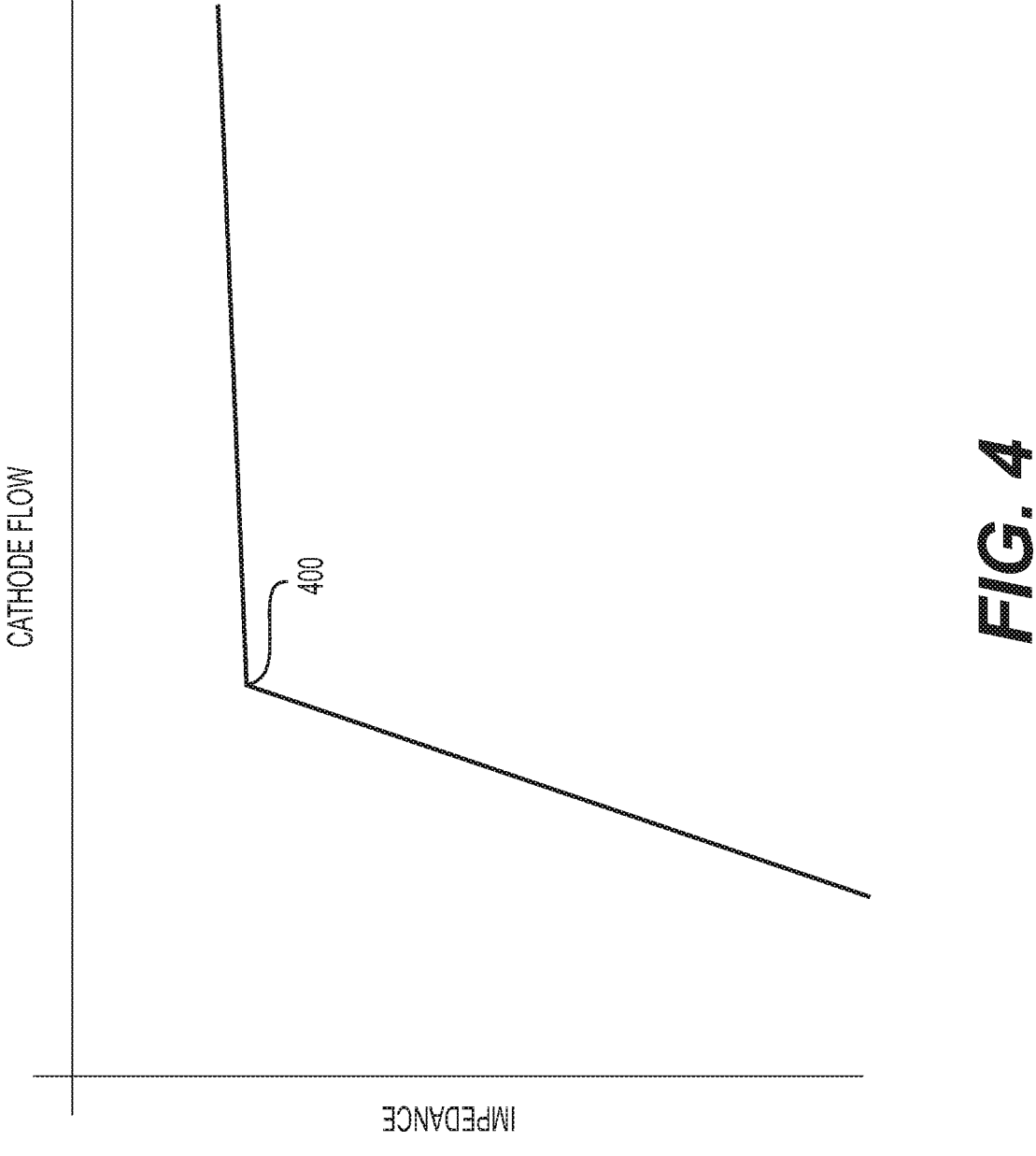
FIG. 4 is a plot of electrochemical impedance vs. cathode flow in a fuel cell at various cathode flows, according to an exemplary embodiment.

Measurement of the impedance of the fuel cells in fuel cell stack 100 can provide information regarding the hydration state of the fuel cells. For example, FIG. 4 is a plot illustrating the relationship of cathode flow to electrochemical impedance, according to an exemplary embodiment of fuel cell stack 100. As shown in FIG. 4, if the cathode flow of the fuel cell stack 100 is reduced from a large flow to a progressively smaller flow, while holding the temperature of the coolant as measured by sensor 160 at a stable value, and holding the current through the fuel cell stack 100 as measured by sensor 140 at a stable value, the impedance of each cell as determined at step 265 with respect to the cathode flow as measured by sensor 180 may be observed to decrease at a first slope and then change to a second slope at a certain flow. In other words, the rate of change of the ECI exhibits a change. This change or maximum change in the slope or rate of change is identified as point 400 in FIG. 4. The impedance at point 400 is considered to correlate to a target hydration state for fuel cell stack 100, which provides enhanced performance. Thus, the impedance at point 400 may be identified as a target impedance value for all the cells in the fuel cell stack 100 for the given current as measured by sensor 140 and coolant temperature as measured by sensor 160. In some embodiments, this process of identifying a target impedance may be repeated for all expected operating fuel cell stack currents and coolant temperatures to generate a set of target impedance values for all expected operating conditions.

Figure 5:
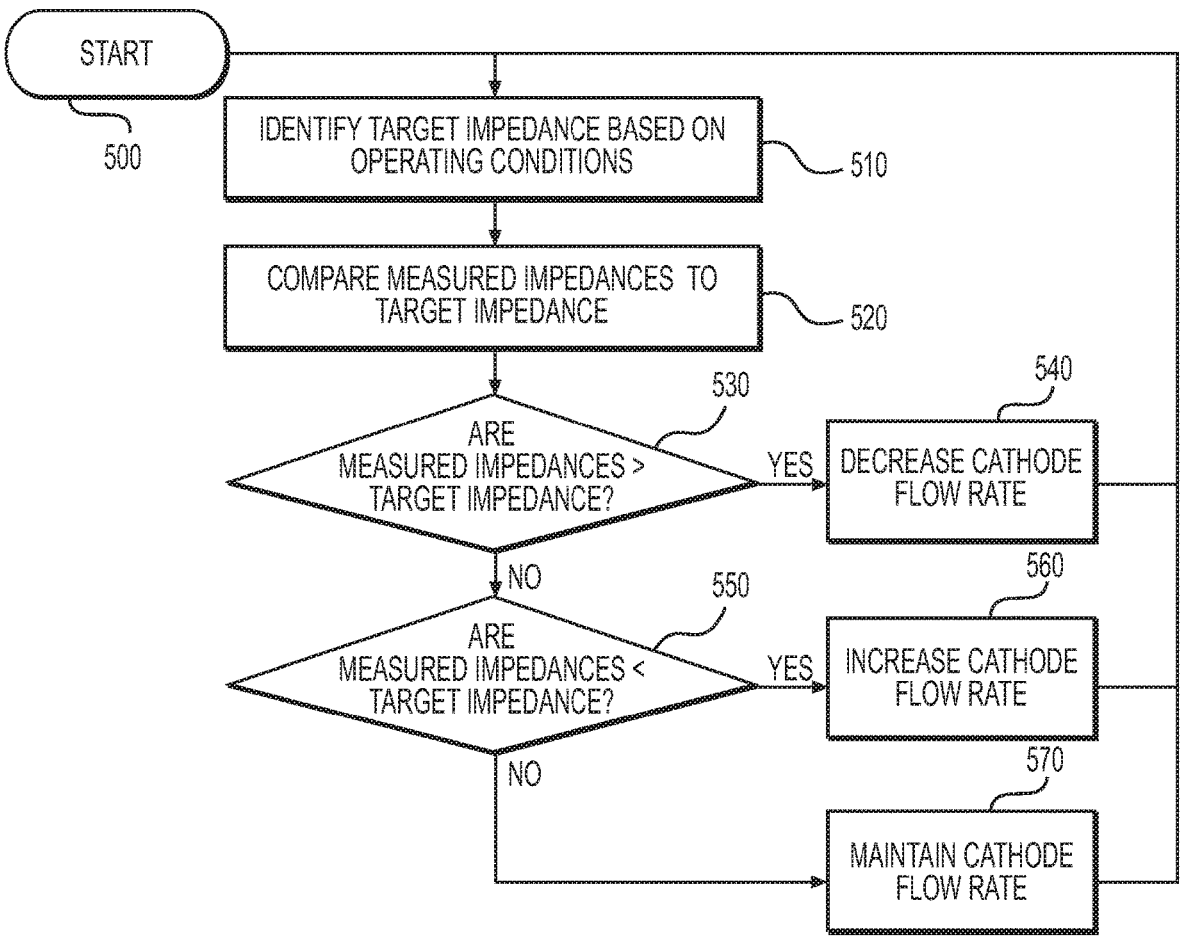
FIG. 5 is a flow chart of a method for controlling the cathode flow of a fuel cell to maintain a target electrochemical impedance, which corresponds to target hydration state of a fuel cell, according to an exemplary embodiment.

With a target impedance identified for fuel cell stack 100, controller 120 may be configured to control operation of system 10 (e.g., cathode flow rate) in order to maintain the fuel cell stack 100 at the target impedance. For example, an exemplary method for controlling cathode flow for a fuel cell stack 100 to maintain a target impedance is illustrated in FIG. 5. The method may begin with fuel cell stack 100 activation or startup (step 500). At step 510, the target ECI may be identified by controller 120 based on the current as measured by sensor 140 and coolant temperature as measured by sensor 160, for example, as described above with reference to FIG. 4. At step 520, controller 120 may measure the ECI (e.g., as obtained from step 265—FIG. 2) for each cell in fuel cell stack 100 and compare the average ECI minus two standard deviations to the target ECI identified at step 510. Other values relating to the measured ECI may be used, for example, the average ECI, the highest ECI, the lowest ECI, or other suitable value. At step 530, controller 120 may determine whether the average ECI minus two standard deviations is greater than the target ECI, or optionally, is greater than the target ECI plus a predetermined amount. If the average ECI minus two standard deviations is greater than the target ECI (step 530: yes), controller 120 may command the oxidizer system 130 to decrease the cathode flow (step 540). If the average ECI minus two standard deviations is not greater than the target impedance (step 530: no), controller 120 may proceed to step 550. At step 550, controller 120 may determine whether the average ECI minus two standard deviations is less than the target ECI, or optionally, is less than the target ECI minus a predetermined amount. If the average ECI minus two standard deviations is less than the target ECI (step 550: yes), controller 120 may command oxidizer system 130 to increase the cathode flow (step 560). If the average ECI minus two standard deviations is not less than the target impedance (step 550: no), controller 120 may command the oxidizer system to maintain the cathode flow (step 570). This process may be repeated for as long as fuel cell stack 100 is generating current.

Figure 6:
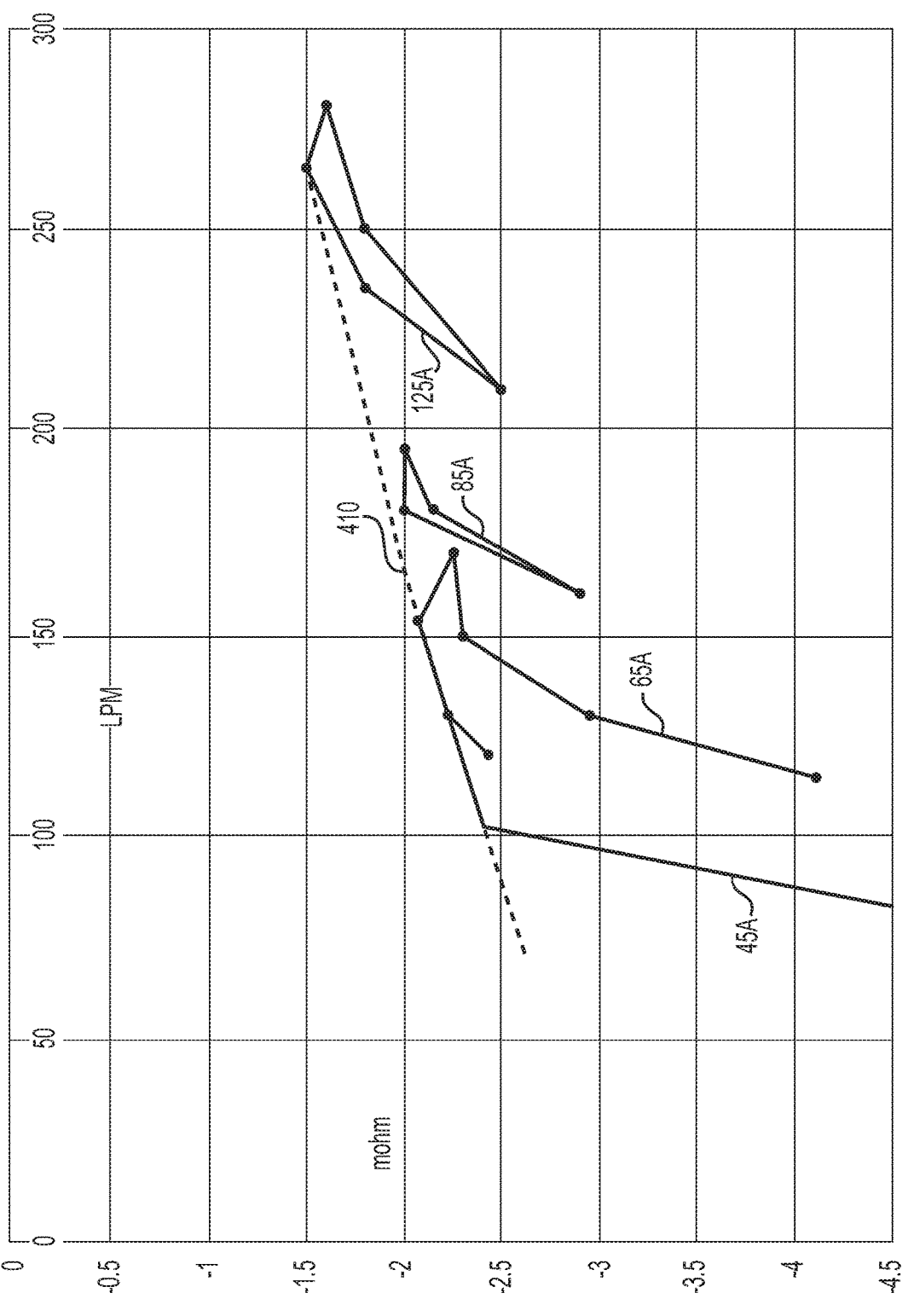
FIG. 6 is a plot of electrochemical impedance vs. cathode flow at four different currents (45 A, 65 A, 85 A, and 125 A) in a fuel cell at various cathode flows, according to an exemplary embodiment.

Similar to FIG. 4, FIG. 6 is a graph illustrating the relationship of cathode flow to ECI, according to exemplary embodiments of fuel cell stack 100. However, FIG. 6 illustrates empirical measurements of ECI vs. cathode air flow at four different current levels: 45 A, 65 A, 85 A, and 125 A. The solid lines are approximations of the empirical measurements. As illustrated in FIG. 6, for each current, the plot shows a peak, the operating conditions at the peak may correspond to a target hydration state for fuel cell stack 100 when operating at that current. As illustrated in FIG. 6, the peak of the four different currents align to form a peak line 410 represented by the dotted line. According to exemplary embodiments, in order to maintain a target hydration state (i.e., prevent flooding or drying out of fuel cell stack 100), controller 120 may be configured to control the cathode air flow so that the ECI is maintained at or near the peak line 410.

An increase in current makes ECI more negative and indicates more water being generated. An increase in cathode flow makes ECI less negative and indicates less water in the stack, and a decrease indicates more water. As described herein, an objection of the present disclosure is to provide a control system that enhances fuel cell stack performance by maintaining a target hydration state as current and stack temperature vary during operation, regardless of ambient conditions. Under the assumption that ECI is a good indicator for hydration state, this means controlling ECI. One manner for controlling ECI is to adjust cathode flow. The following examples describe control systems that controller 120 may utilize to control the cathode air flow in order to maintain the impedance (ECI) at or near the peak line 410 (i.e., target ECI), thereby maintaining a target hydration state for fuel cell stack 100.

Example 1

Figures 7, 8:
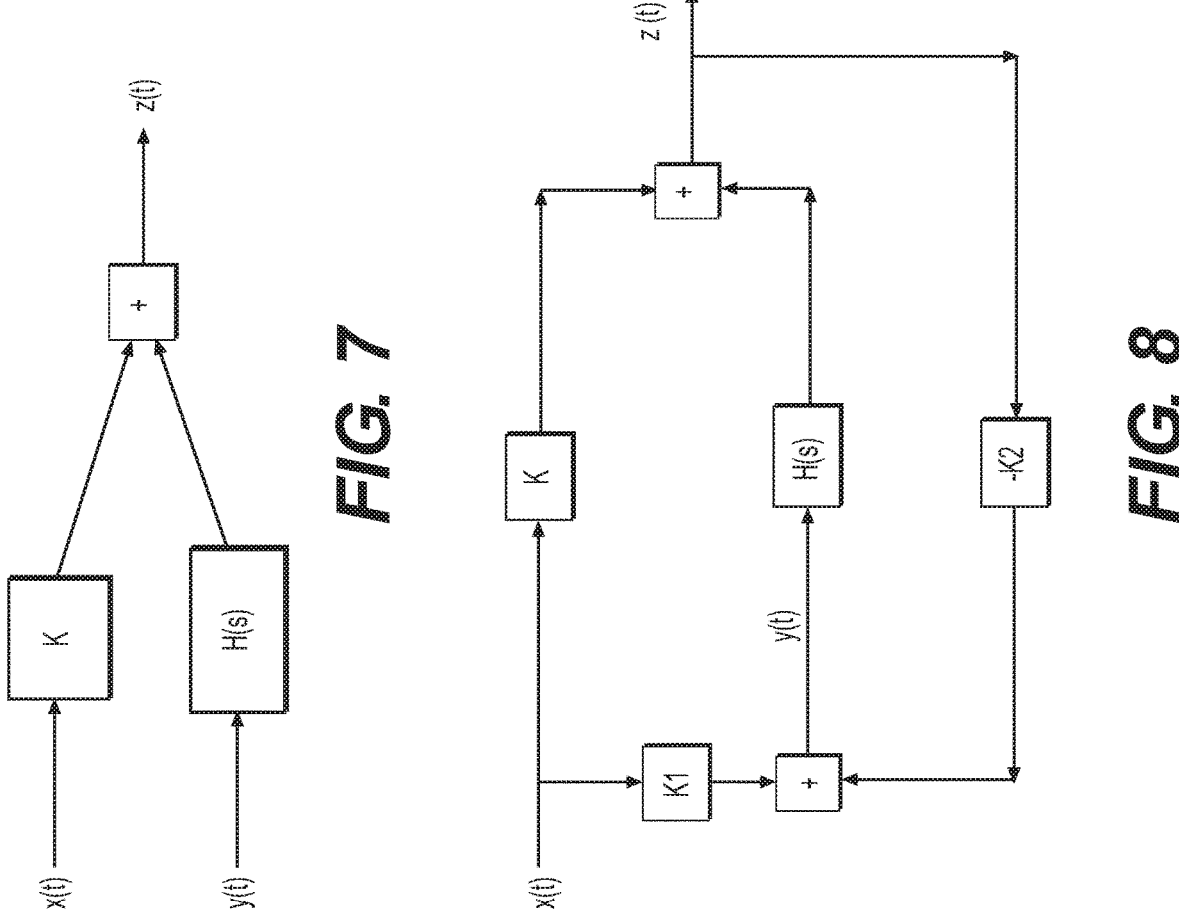
FIG. 7 is a block diagram of a first embodiment of an open loop control system, according to an exemplary embodiment.
FIG. 8 is a block diagram of a first embodiment of a closed loop control system, according to an exemplary embodiment.

Example 1 describes an open loop control system, which is represented by the block diagram in FIG. 7. According to Example 1, the method of control can utilize four time varying entities: (a) the electric current output from the fuel cell stack, (b) the ECI computed from the voltage of each cell, (c) fuel cell stack temperature, and (d) the cathode flow input to the stack. Temperature is assumed to be held constant for Example 1. The control system of Example 1 utilizes cathode flow to control the ECI and thereby the hydration state of electrochemical cell 100. In other embodiments, current control may also be implemented. Generally, the control system of Example 1 operates by determining whether any cell has an ECI greater or less than the target ECI, and optionally, greater or less than the target ECI plus or minus a predetermined amount, and then adjusting the cathode flow accordingly to correct the ECI.

The system variables for Example 1 may be defined in terms of deviations from reference operating points as follows:

x(t)=(the current at t)=85 A y(t)=(the airflow at t)=180 slpm (liters per minute of air at standard atmospheric conditions)

z(t)=(target cell ECI at t)=−2 mΩ

It may be assumed there is a direct and linear relationship between a change in x(t) and the corresponding change in z(t) with no delay. The relationship between a change in cathode flow and the resulting change in ECI is modeled by a linear and time-invariant system. This means that z(t) may be represented by equation (4) below:

$$z(t) = z(t_0) + K[x(t) - x(t_0)] + \int_{t_0}^{t} h(t - \tau)y(\tau)d\tau \quad t \geq t_0 \qquad (4)$$

where h(•) denotes the impulse response. Given $t_0$=0, the relationship described in (4) may be conceptualized as a block diagram as shown in FIG. 7.

The function H(s) may be referred to as the system function, or transfer function. It is the Laplace Transform of the impulse response h(t), i.e., as represented by equation (5) below:

$$H(s) = \int_{0}^{\infty} e^{-st} h(t)dt \qquad (5)$$

X(s), Y(s) and Z(s) may be defined as the Laplace Transforms of x(t), y(t) and z(t), respectively. Therefore, equation (4) can be replaced by algebraic equation (6) below:

$$Z(s) = KX(s) + H(s)Y(s) \tag{6}$$

If the operating conditions are assumed to be: current=85 A, cathode flow=180 slpm, and ECI target=−2 mΩ, the following can then be deduced:

$$K = -.02 \ m\Omega / A \tag{7}$$

$$H(s) = \frac{a}{1 + sT} \tag{8}$$

where, a=0.05 mΩ/slpm and T=80 s. The constants K, a, and T may be parameters measured for the above operating point. Linearity among the entities may be limited to a small region of the operating point.

Example 2

Example 2 describes a first embodiment of a closed loop control system. Controlling ECI by adjusting the cathode flow can be done based on a signal (e.g., feedforward) directly from the current measurement. This can also be done by feedback from the ECI measurement. These two means for control are represented in the block diagram as shown in FIG. 8, where $K_1$ and $K_2$ are design parameters and are assumed to be positive. This means there is negative feedback that can provide system stability.

In terms of the Laplace Transforms of the various entities, we can express the interrelationship depicted in FIG. 8 in algebraic form as equations (9) and (10) as follows:

$$Y(s) = K_1 X(s) - K_2 Z(s) \tag{9}$$

$$Z(s) = KX(s) + H(s)Y(s) \tag{10}$$

These equations may be derived from the two summation points in FIG. 8. Equations (9) and (10) can be solved for Y(s) and Z(s) and result in equations (11) and (12) as follows:

$$Y(s) = \left( \frac{K_1 - K_2 K}{1 + K_2 H(s)} \right) X(s) \tag{11}$$

$$Z(s) = \left( \frac{K + H(s)}{1 + K_2 H(s)} \right) X(s) \tag{12}$$

With H(s) given by equation (8), this can be incorporated to yield equation (13) as follows:

$$1 + K_2 H(s) = \left( \frac{1 + K_2 a + sT}{1 + sT} \right) \tag{13}$$

The product $K_2 a$ represents the gain around the feedback loop y→z→y and it can be useful to define it as a single parameter as follows:

$$\beta = K_2 a \tag{14}$$

which will be called the loop gain. Now equations (11) and (12) can be simplified as follows:

$$H_1(s) = Y(s)/X(s) = \left( \frac{1}{a} \right) (aK_1 - \beta k) \left( 1 - \frac{\beta}{1 + \beta + sT} \right) \tag{15}$$

$$H_2(s) = Z(s)/X(s) = K + (aK_1 - \beta k) \left( 1 - \frac{\beta}{1 + \beta + sT} \right) \tag{16}$$

It may be assumed that the current reaches steady state after sufficient time. That means:

$$x(t) \rightarrow x_\infty, t \rightarrow \infty$$

By denoting the impulse response (Inverse Laplace Transform) corresponding to $H_1$ and $H_2$ by $h_1$ and $h_2$ respectively, yields equations (17) and (18) below:

$$y(t) = y(0) + \int_0^t h_1(u)x(t-u)du \tag{17}$$

$$z(t) = z(0) + \int_0^t h_2(u)x(t-u)du \tag{18}$$

If follows that as t→∞, $$y(t) \rightarrow y(0) + \int_0^\infty h_1(u)du = y(0) + H_1(0)x_\infty = y_\infty \tag{19}$$

$$z(t) \rightarrow z(0) + \int_0^\infty h_2(u)du = z(0) + H_2(0)x_\infty = z_\infty \tag{20}$$

Starting from reference settings at t=0, y(0) and z(0) are both 0. Using equations (15) and (16), yields equations (21) and (22) as follows:

$$y_\infty = \left( \frac{1}{a} \right) \left( \frac{aK_1 - \beta K}{1 + \beta} \right) x_\infty \tag{21}$$

$$z_\infty = \left[ K + \left( \frac{aK_1 - \beta K}{1 + \beta} \right) \right] x_\infty \tag{22}$$

It may be noted, that for the closed-loop configuration of Example 2, as shown in FIG. 8, if the current reaches a steady-state value, then so will both cathode flow and ECI. This may be referred to as the regulator property.

Now it may be observed that if $$\left( \frac{aK_1 - \beta K}{1 + \beta} \right) = -K,$$

then $z_\infty$=0. This means that whatever the new current setting may be the ECI can be restored to the initial setting provided that the following is set:

$$K_1 = -\left( \frac{1}{a} \right) K \tag{23}$$

This may be referred to as the strong regulator property. This is a stability property of the closed-loop control system of Example 2, depicted by FIG. 8, with the value of $K_1$ given by (23). With values given in (7) and (8) of Example 1, we have $$K_1 = 0.4 \text{ slpm}/A \qquad (24)$$

and $$y_\infty = K_1 x_\infty = 0.4 x_\infty \qquad (25)$$

For example, if the new steady state value of the current is 125 amp ($x_\infty = 40$) then the new equilibrium settings may be: current=125 amp, cathode flow=260 slpm, ECI=−1.5 mΩ. It is noted that the feedback loop is not required to achieve the strong regulator property. However, the feedback loop may enhance the transient behavior.

For example, assuming the current is changed instantly from 85 amp to 85 amp+$x_\infty$. That means $$x(t) = 0, t < 0 \qquad (26)$$
$$= x_\infty, t \geq 0$$

The Laplace Transform of x(t) is $$X(s) = x_\infty/s \qquad (27)$$

If a new parameter is defined as follows:

$$\alpha = \frac{1 + \beta}{T} \qquad (28)$$

then equation (29) and (30) may be written as follows:

$$Y(s) = 0.4 x_\infty \left[ \left( \frac{1}{s} \right) + \frac{\beta}{s + \alpha} \right] \qquad (29)$$

$$Z(s) = -0.02 x_\infty \left( \frac{1}{s + \alpha} \right) \qquad (30)$$

If the change in current is 40 A, then we can get the transient response for airflow and ECI as:

$$y(t) = 16[1 + \beta e^{-\alpha t}] \qquad (31)$$

$$z(t) = -0.8 e^{-\alpha t} \qquad (32)$$

Increasing β will return z(t) to 0 more quickly. For example, if β=0, the ECI will return to about −2.3 mohm in 80 s, but with β=9, the same value in ECI may be achieved in one tenth of the time.

Both open-loop (FIG. 7) and closed-loop (FIG. 8) representations of the system are models based on some simplifying assumptions. These examples are intended to capture the underlying interaction sufficiently well to produce effective closed-loop control.

Figure 12:
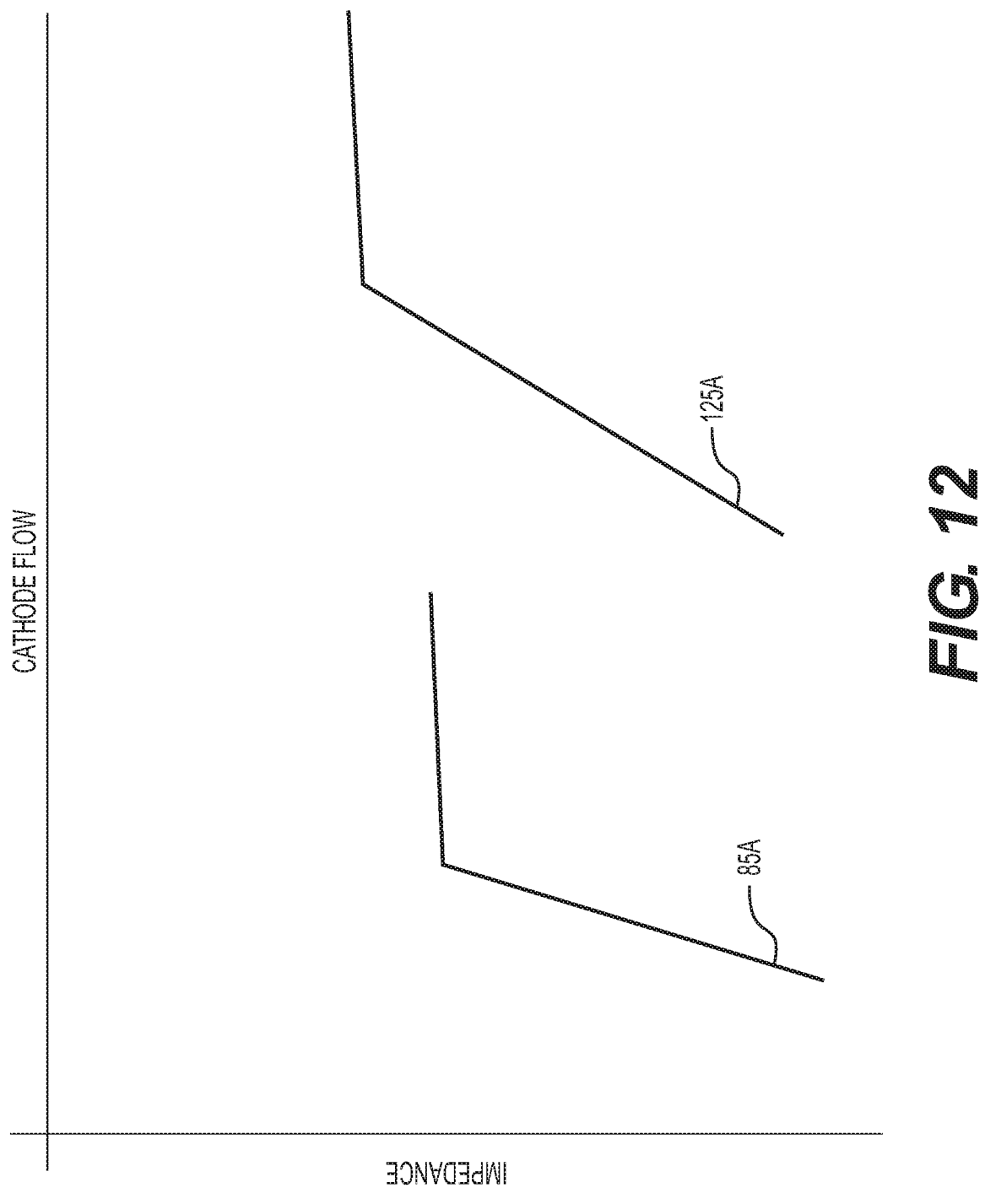
FIG. 12 is a plot of electrochemical impedance vs. cathode flow for two different currents (85 A and 125 A), according to an exemplary embodiment.

One assumption is the linearity of the system. The open-loop system shown in FIG. 7 is linear and time-invariant. The physical situation suggests that time-invariance is not in question. Linearity is based in part on the measurement of ECI vs. cathode flow for fixed currents. A reasonable approximation of anticipated results is depicted in FIG. 12. The path taken by transient behavior of the example of equations (26) through (32) is indicated. As shown in FIG. 12, the relationship between ECI and cathode flow is quite linear for much of the operating range, but not entirely. For the transient example the path is entirely linear. However, the slope is current dependent. That is an indication of nonlinearity. This may suggest that the value for the parameter a estimated for the current at 85 A is too high for the transient analysis where the current is 125 A. In future refinement of the system model an attempt may be made to include this effect. However, the overall effectiveness of our control system does not appear to be affected.

Another assumption is that current, cathode flow, and ECI for the fuel cell stack are quite nonlinear, but probably time-invariant inasmuch as the ambient conditions change slowly compared to the dynamics of the main interaction. Nonlinear dynamical systems can be hard to analyze. But fortunately, linear approximation in local regions of the space representing (current, cathode flow, and ECI) proves to be quite effective. With a steady current, the relationship between cathode flow and current is linear, and the resulting quasi-linearization facilitates using frequency domain techniques to model a closed-loop system.

Another assumption is that the effect of an increase in current on ECI is instantaneous. This is not entirely accurate because it takes time for water to be generated. However, it is believed that the time constant involved will be much shorter than that assumed in the cathode flow vs. ECI relationship. Therefore, the assumption of instantaneous effect of current on ECI is reasonable. Furthermore, any delay would be difficult to measure and have minimal effect on the performance of control systems described herein.

Another assumption is the long time constant (80 s) in the effect of cathode flow on ECI. The length of the time constant reflects mostly computation time. Nonetheless, the control in the system may depend on the actual ECI signal and whatever time constant that is seen in the signal may be taken. Improvement can be made in this regard by injecting a sinusoidal probing current (e.g., say at 100 Hz) and detecting the sinusoidal voltage on the worst cell. The envelope of the voltage, nearly instantaneously produced by a simple analog circuit, directly measures the ECI without computation (see e.g., discussion of single frequency ECI discussed herein). Such an arrangement can make the control systems more responsive. If the resulting time constants become comparable to that of current-ECI interaction, then the result will be lower levels of transient ECI and faster restoration of ECI to the prescribed set-point. The resulting improvement may extend the operating limits on the system imposed by water management.

Example 3

Example 3 describes another open loop control system. The system variables for Example 3 are defined as:
x=current—85 A
y=air flow—185 lpm
z=ECI—(−1.95 mohm)
Referring back to FIG. 6, an approximation for peak line 410 may be:

$$y = 2x \qquad (33)$$

$$z = 0.01x \qquad (34)$$

which in turn may imply:

$$z = 0.005y \qquad (35)$$

Figures 9, 10:
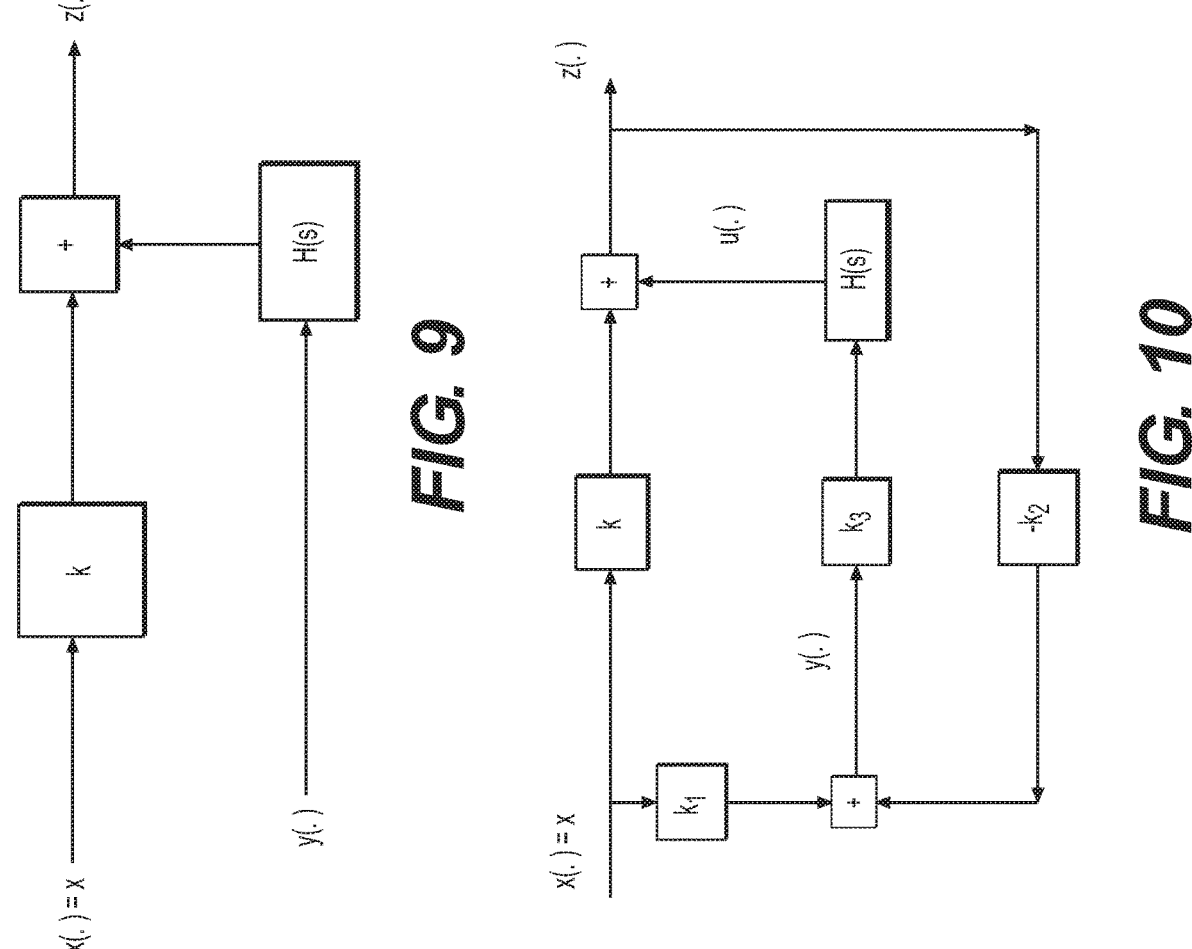
FIG. 9 is a block diagram of a second embodiment of an open loop control system, according to an exemplary embodiment.
FIG. 10 is a block diagram of a second embodiment of a closed loop control system, according to an exemplary embodiment.

The relationship of the three system variables may be modeled as they change in time. The time variations may be denoted by x(t), y(t), z(t). If x(t)=x is assumed a constant, then the dynamical relationship between y(t) and z(t) can be represented by a linear and time-invariant system. A block diagram depiction of the system is shown in FIG. 9. In FIG. 9, the time variable t is not utilized to help illustrate that the block diagram is a frequency domain representation. The block containing k may represent an amplifier with gain equal to k. The block containing H(s) may represent a low pass filter with a transfer function represented by equation (36) below:

$$H(s)=a/(1+sT) \tag{36}$$

The three parameters k, a and T may be constants as long as control system of FIG. 9 is utilized when the current is constant.

Example 4

Example 4 describes a closed loop control system, which is represented by the block diagram in FIG. 10. Example 4 converts the control system of Example 3 to a closed loop control system by adding three amplifiers and various connections, including a feedback loop from ECI to cathode airflow. For Example 4, parameters: k, a, and T may be measured quantities and may depend on the current x. Parameters: $k_1$, $k_2$ and $k_3$ may be control parameters chosen to achieve control objectives. As shown in FIG. 10, an amplifier with gain $k_3$ has been incorporated before the low pass filter H(s). A system variable u($\bullet$) has also been added, which will be used for the time-domain representation that is described further herein.

The control parameters may be calculated by using frequency domain analysis to combine various parts of the system. This may be done by introducing Laplace transform of the entities x($\bullet$), y($\bullet$) and z($\bullet$) as follows:

$$x(s) = \int_0^\infty e^{-st}x(t)dt = x\int_0^\infty e^{-st}dt = x/s \tag{37}$$

$$y(s) = \int_0^\infty e^{-st}y(t)dt \tag{38}$$

$$z(s) = \int_0^\infty e^{-st}z(t)dt \tag{39}$$

Equating the output with the inputs at the two summation points in FIG. 10 yields:

$$Y(s)=k_1X(s)-k_2Z(s) \tag{40}$$

$$Z(s)=kX(s)+k_3H(s)Y(s) \tag{41}$$

which can be solved for Y(s) and Z(s) immediately in terms of X(s). The solutions have the form of:

$$Y(s) = G_1(s)X(s) \tag{42}$$

$$Z(s) = G_2(s)X(s) \tag{43}$$

where $$G(s) = \begin{bmatrix} G_1(s) \\ G_2(s) \end{bmatrix} = \begin{bmatrix} 1 & k_2 \\ -k_2H(s) & 1 \end{bmatrix}^{-1} \begin{bmatrix} k_1 \\ k \end{bmatrix} \tag{44}$$

Thus, in time domain:

$$\begin{bmatrix} y(t) \\ z(t) \end{bmatrix} = \int_0^t \begin{bmatrix} g_1(\tau) \\ g_2(\tau) \end{bmatrix} x(t-\tau)d\tau \tag{45}$$

where $g_i$ are the inverse Laplace transform of $G_i$ and may be known as impulse function. With x(t)=x is a constant, this results in:

$$\begin{bmatrix} y(t) \\ z(t) \end{bmatrix} = x\int_0^t \begin{bmatrix} g_1(\tau) \\ g_2(\tau) \end{bmatrix} d\tau \tag{46}$$

The steady state values are given by:

$$\begin{bmatrix} y(\infty) \\ z(\infty) \end{bmatrix} = x\int_0^t \begin{bmatrix} g_1(\tau) \\ g_2(\tau) \end{bmatrix} d\tau = x\begin{bmatrix} G_1(0) \\ G_2(0) \end{bmatrix} \tag{47}$$

From (33) and (34) we know that if we want the steady state values to fall on the peak line then we must have $$\begin{bmatrix} y(\infty) \\ z(\infty) \end{bmatrix} = \begin{bmatrix} 2 \\ .01 \end{bmatrix} x \tag{48}$$

Combining (44), (47) and (48) and noting that H(0)=a, yields:

$$\begin{bmatrix} k_1 \\ k \end{bmatrix} = \begin{bmatrix} 1 & k_2 \\ -k_3a & 1 \end{bmatrix} \begin{bmatrix} 2 \\ .01 \end{bmatrix} \tag{49}$$

From (49):

$$k_1=2+0.01k_2 \tag{50}$$

$$k_3a=0.01-k \tag{51}$$

It can be useful to introduce the feedback loop gain as:

$$\beta=k_2k_3a \tag{52}$$

as an independent parameter that measures the extent of feedback. Equations (50) and (51) then yield:

$$k_1 = 2 + \frac{.01\beta}{.01 - k} \tag{53}$$

$$k_3 = \frac{.01 - k}{a} \tag{54}$$

Both a and k depend on current. From measurements for current at 85 amp (x=0)
k(0)=−0.02 mohm/amp and a(0)=0.05 mohm/lpm
Hence, $$k_1(0) = 2 + \left(\frac{1}{3}\right) \tag{55}$$

$$k_3(0) = .6 \tag{56}$$

The general forms of k(x) and a(x) may be unknown and may need to be determined from empirical measurements and modeling.

The situation on the various system parameters can be summarized as follows: there are two current-dependent parameters k(x) and a(x). There is an independent parameter $\beta$ that can be adjusted to set the level of feedback. All other parameters in FIG. 10 may be fully determined in terms of these three.

The standard time-domain representation of dynamical systems may be through the use of state variables. For the purposes of the present disclosure, a suitable choice for a state variable is the entity u(•), as shown in FIG. 10, as the output of the low-pass filter H(s). From Equation (36), equation (57) may be determined:

$$T\frac{du(t)}{dt} + u(t) = k_3 ay(t) \tag{57}$$

Considering the input and output at the summation points in FIG. 10, allows elimination of y(t) and z(t) to get an equation in u(t) and x(t) alone. Upon simplification through the use of equations (51) to (53), this equation has the form:

$$T\frac{du(t)}{dt} + (1 + \beta)u(t) = (2 + \beta)[.01 - k(x(t))]x(t) \tag{58}$$

where the current dependency of k may be explicitly included.

From empirical observations we note that the time constant T varies very little with current, so that we shall assume it to be a constant with an approximate value of 80 seconds. As a result, equation (58) may be simplified further by introducing the parameter:

$$\alpha = \frac{1+\beta}{T} \tag{59}$$

And equation (58) may be rewritten as:

$$\frac{du(t)}{dt} + \alpha u(t) = \left(\frac{2+\beta}{T}\right)[.01 - k(x(t))]x(t) \tag{60}$$

This is the state equation, which can satisfy the requirement of state representation that only the state variables are differentiated. We can also write the output equation, as derived from FIG. 8, as:

$$\begin{bmatrix} y(t) \\ z(t) \end{bmatrix} = \begin{bmatrix} -\frac{\beta}{(.01 - k(x(t)))} \\ 1 \end{bmatrix} u(t) + \begin{bmatrix} \frac{2+\beta}{k(x(t))} \end{bmatrix} x(t) \tag{61}$$

Equation (60) is the state equation, and equation (61) the output equation, in a standard state-representation of the ECI closed loop control system. Because of the presence of k(x(t)), the representation is for a nonlinear system. However, an examination of (60) and (61) reveals that the nonlinearity may only be superficial and can be transformed away. This can advantageous, because it reveals that after manipulation, the ECI closed loop system can be represented as a time-invariant and linear system for which the dynamics under any conditions can be fully determined through frequency domain analysis. Consequently, the effect of any changes of current on ECI and airflow can now be explicitly predicted.

To demonstrate that the control system can be fully represented as a time-invariant and linear system, following transformation of variables may be defined as follows:

$$v(t)=(0.01-k(x(t)))x(t) \tag{62}$$

$$w_1(t)=(0.01-k(x(t)))y(t) \tag{63}$$

$$w_2(t)=z(t)-0.01x(t) \tag{64}$$

By taking u(t) as the state, v(t) as the input, and $(w_1(t), w_2(t))$ as the output, the state-input-output equations can be written as:

$$\frac{du(t)}{dt} + \alpha u(t) = \left(\frac{2+\beta}{T}\right)v(t) \tag{65}$$

$$\begin{bmatrix} w_1(t) \\ w_2(t) \end{bmatrix} = \begin{bmatrix} -\beta \\ 1 \end{bmatrix} u(t) + \begin{bmatrix} 2+\beta \\ -1 \end{bmatrix} v(t) \tag{66}$$

It is noted that the state variable u(t) is internal to the fuel cell and as a result may not be physically accessed. Consequently, the linear time-invariant system described by (65) and (66) is only a model for analysis and may not be appropriate to physically rearrange the control system. Thus, FIG. 10 is a preferred representation of the ECI closed loop control system. Nonetheless, equations (65) and (66) together with the transformation given by (62)-(64) can provide a powerful tool that can be used to predict global behavior of the closed loop system under any load conditions.

In the physical configuration of the closed loop system of Example 4, there are five parameters: k, a, $k_1$, $k_2$, $k_3$. The first two, a and k, are physical parameters that are measured at fixed levels of current. We introduce a feedback loop gain as an independent positive parameter that can be adjusted to achieve the desired amount of feedback. The parameters $k_1$ are then calculated in terms of a, k and to achieve the objective of driving (Airflow, ECI) to the peak line 410 at equilibrium. The formulas for $k_1$ may be represented as follows:

$$k_1 = 2 + \left(\frac{.01}{.01 - k}\right)\beta \tag{67}$$

$$k_2 = \frac{\beta}{.01 - k} \tag{68}$$

$$k_3 = \frac{.01 - k}{a} \tag{69}$$

All these parameters depend on current. The dependency of k on current may be an important calculation for both implementation and analysis of the closed loop control system. For a series of increasing current levels: $x_1$, $x_2$, . . . , ECI and airflow may be measured and plotted, which may enable the following data to be collected:

Current=$x_i$

The peak value of observed ECI=$z_p(x_i)$

The Airflow at peak ECI=$y_p$ $(x_i)$

The minimum value of observed ECI=$z_m(x_i)$

The Airflow at minimum ECI=$t_m(x_i)$

A line may be drawn connecting $(y_m, x_i)$, $z_m(x_i))$ and $(y_p(x_i)$, $z_p(x_i))$ defined by a slope $\lambda(x_i)$ and intercept $\mu(x_i)$. The equation of the line is:

$$\lambda y + z = \mu \qquad (70)$$

To compute $k(x_i)$, it can be assumed that the system is at $(x_i, y_p(x_i), z_p(x_i))$ and the current is increased instantaneously from $x_i$ to $x_{i+1}$. Since Airflow does not change instantaneously, the system can move to the point on the line for $x_{i+1}$ corresponding to $y_p(x_i)$. The value for $k(x_i)$ may be given by the resulting change in ECI divided by the change in current as follows:

$$k(x_i) = [\lambda(x_{i+1})y_p(x_i) + \mu(x_{i+1}) - z_p(x_i)]/(x_{i+1} - x_i) \qquad (71)$$

The following calculation is based the data in Chart 1 below:

| $x_i$ | $y_m$ | $z_m$ | $y_p$ | $z_p$ | $\lambda$ | $\mu$ | $\Delta z$ | $k$ |
|---|---|---|---|---|---|---|---|---|
| −40 | −100 | −2.55 | −85 | −.5 | .137 | 11.12 | −2.96 | −.149 |
| −20 | −65 | −2.15 | −35 | −.15 | .067 | 2.18 | −1.25 | −.063 |
| 0 | −25 | −1 | 0 | 0 | .04 | 0 | −.967 | −.024 |
| 40 | 25 | −.55 | 85 | .45 | .0167 | −.97 | | |

Although we have only 3 values for $k(x)$ to draw general conclusions, the 3 points lie close to a straight line that has the equation:

$$k(x) = -0.016 + 0.0031x \qquad (72)$$

Thus, this formula may be used in the time-domain model for the closed loop system. An advantage of time-domain formulation is that the response to any current $x(t)$ may be computed. For example, equation (65) may be rewritten as:

$$\frac{d}{dt}(e^{\alpha t}u(t)) = e^{\alpha t}\left(\frac{du(t)}{dt} + \alpha u(t)\right) = \frac{2+\beta}{T}(e^{\alpha t}v(t)) \qquad (73)$$

Integrating Both Sides Yields:

$$e^{\alpha t}u(t) - e^{t_0}u(t_0) = \frac{2+\beta}{T}\int_{t_0}^{t}e^{\alpha \tau}v(\tau)d\tau \qquad (74)$$

and $$u(t) = e^{-(t-t_0)}u(t_0) + \frac{2+\beta}{T}\int_{t_0}^{t}e^{-\alpha(t-\tau)}v(\tau)d\tau \qquad (75)$$

Incorporating Equation (62) into Equation (75) Yields:

$$u(t) = e^{-(t-t_0)}u(t_0) + \frac{2+\beta}{T}\int_{t_0}^{t}e^{-\alpha(t-\tau)}[.01 - x(\tau)]x(\tau)d\tau \qquad (76)$$

From Equations (63), (64) and (66), Equations (77) and (78) May be Obtained as Follows:

$$y(t) = (2+\beta)x(t) - \frac{\beta}{(.01 - k(x(t)))}u(t) \qquad (77)$$

and $$z(t) = u(t) + k(x(t))x(t) \qquad (78)$$

Equations (76)-(78) complete the explicit expression of the state-output-input relationship for the ECI closed loop system of Example 4.

Example 5

Figure 11:
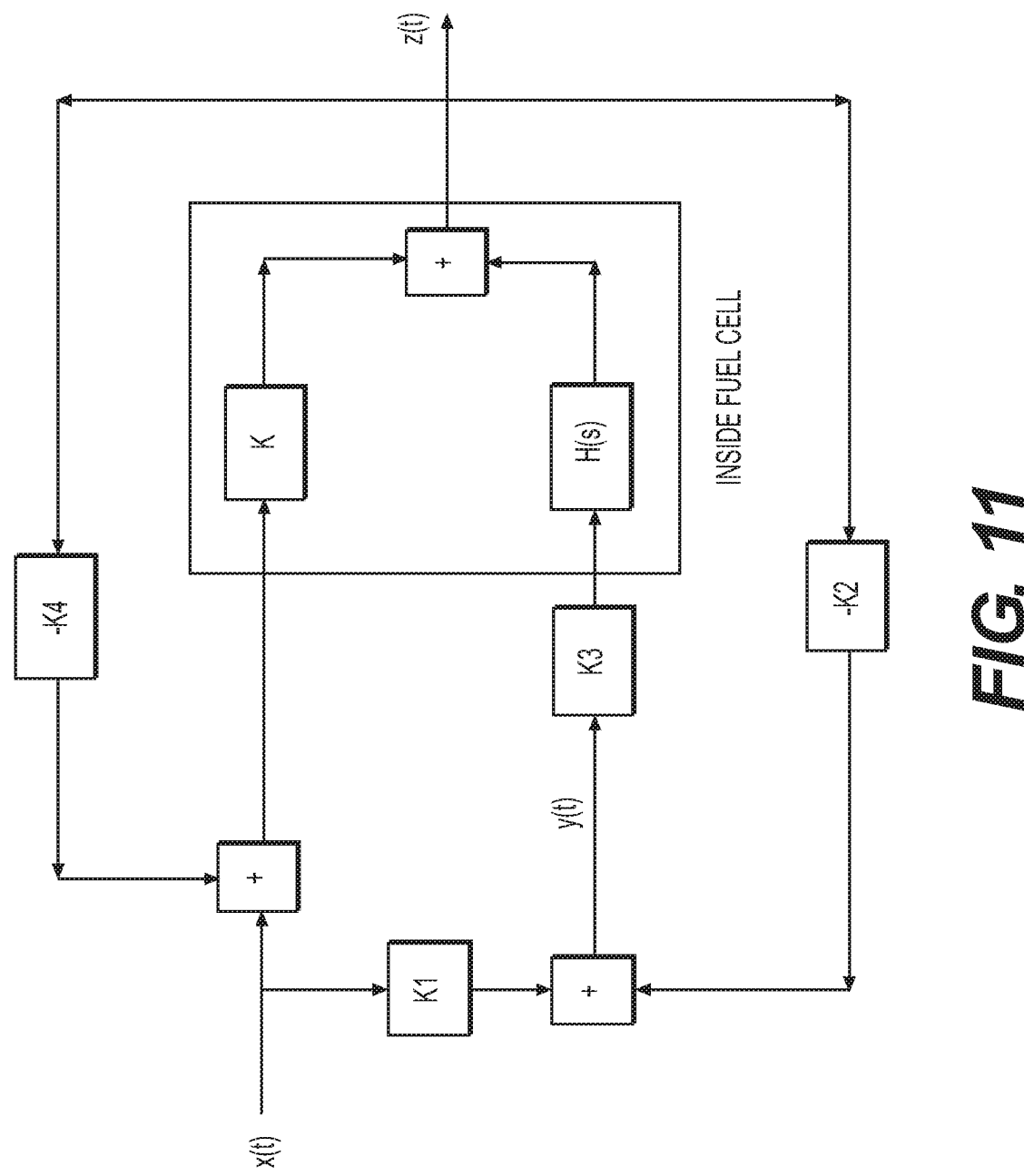
FIG. 11 is a block diagram of a third embodiment of a closed loop control system, according to an exemplary embodiment.

Example 5 describes a closed loop control system, which is represented by the block diagram in FIG. 11. Example 5 is similar to the control system of Example 2, except it adds an additional feedback loop from ECI to current. For Example 5, parameters: k, a and T may be measured quantities and may depend on the current x. Parameters: $k_1$, $k_2$, $k_3$, and $k_4$ may be control parameters that can be adjusted to achieve control objectives. As shown in FIG. 11, an amplifier with gain $k_3$ has been incorporated before the low pass filter H(s). Also, an amplifier with gain $-k_4$ has been incorporated in the feedback loop from ECI to current.

For Example 5, the System Variables May be Defined as Follows:

x(t)=(the current at t)=85 A y(t)=(the airflow at t)=180 slpm z(t)=(target cell ECI at t)=−2 mΩ

The system variable may be measured from a fixed operating point. As explained above, the function H(s) may be referred to as the system function, or transfer function, and may be derived as explained above in reference to Example 2, which can yield:

$$H(s) = \frac{a}{1+sT}$$

where, a=0.05 mΩ/slpm and T=80 s. The constants K, a, and T may be parameters measured for the above operating point.

When utilizing the control system of Example 5, if $-k_4$ is set to zero then there will be no feedback from ECI to the current loop. The addition of this current feedback loop may enable reduction of the current and also reduction of the time constant, which should improve the response time of the system.

As described herein, these closed loop control systems have been constructed for the interaction among three variables: current drawn from the fuel cell stack, cathode flow, and ECI of the cells in the stack. Controller 120 may execute the closed loop control systems described herein, in order to maintain a target hydration state of fuel cell stack 100. The closed loop control systems described herein have a number benefits. For example, they do not require high speed measurements and calculations nor do they require expensive computationally intensive devices to determine ECI.

Although the present disclosure focuses on control systems for maintaining a target hydration state based on ECI of the fuel cell stack, it is understood in other embodiments, control systems may utilize other indicators of hydration state besides ECI. For example, voltage, cathode humidity, or other suitable indicators.

The foregoing is a detailed description of illustrative embodiments of the invention using specific terms and expressions. Various modifications and additions can be made without departing from the spirit and scope thereof. Therefore, the invention is not limited by the above terms and expressions, and the invention is not limited to the exact construction and operation shown and described. For example, the described embodiments of fuel cell 10 may be adapted for used with a variety of electrochemical cells.

Similarly, the arrangement of cells and the electrochemical stacks described herein are merely exemplary and may be applied to a range of other fuel cells configurations.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps and/or inserting or deleting steps.

The features and advantages of the disclosure are apparent from the detailed specification, and thus, it is intended that the appended claims cover all cells and cell stacks falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

As used herein, the term "about" is used to modify a numerical value above and below the stated value by a variance of 25%, 20%, 15%, 10%, 5%, or 1%. In some embodiments, the term "about" is used to modify a numerical value above and below the stated value by a variance of 10%. In some embodiments, the term "about" is used to modify a numerical value above and below the stated value by a variance of 15%. In some embodiments, the term "about" is used to modify a numerical value above and below the stated value by a variance of 10%. In some embodiments, the term "about" is used to modify a numerical value above and below the stated value by a variance of 5%. In some embodiments, the term "about" is used to modify a numerical value above and below the stated value by a variance of 1%.

As used herein, the terms "fuel cell" and "electrochemical fuel cell," and plural variants thereof, may be used interchangeably and are understood to be identical in meaning. As used herein, the terms impedance and electrochemical impedance (ECI) are used interchangeably and are understood to be identical in meaning.

Computer programs, program modules, and code based on the written description of this specification, such as those used by the microcontrollers, are readily within the purview of a software developer. The computer programs, program modules, or code can be created using a variety of programming techniques. For example, they can be designed in or by means of MatLab/Simulink, LabVIEW, Java, C, C++, assembly language, or any such programming languages. One or more of such programs, modules, or code can be integrated into a device system or existing communications software. The programs, modules, or code can also be implemented or replicated as firmware or circuit logic.

Other embodiments of the present disclosure will be apparent to those skilled in the art from consideration of the specification and practice of the present disclosure herein. It is intended that the specification and examples be considered as exemplary only, with a true scope and spirit of the present disclosure being indicated by the following claims.

What is claimed is:

1. A method of maintaining hydrate state by determining an electrochemical impedance (ECI) of a fuel cell, the method comprising:

verifying stable operating conditions for the fuel cell;

measuring a current output by the fuel cell and recording a first current value;

measuring a voltage across the fuel cell and recording a first voltage value;

perturbing the current output from the fuel cell;

verifying the current output by the fuel cell and the voltage across the fuel cell have stabilized following the perturbing of the current output;

measuring the current output by the fuel cell and recording a second current value;

measuring the voltage across the fuel cell and recording a second voltage value;

determining ECI of the fuel cell by dividing difference between the first voltage value and second voltage value by the difference between the first current value and the second current value;

identifying a target ECI for the fuel cell, which corresponds to a target hydration state for the fuel cell; and adjusting a cathode flow to the fuel cell, by a controller commanding an oxidizer system, based on the determined ECI;

wherein the ECI is an indicator for the hydration state of the fuel cell;

wherein the current output and the voltage are considered stable when the measured results are not fluctuating by more than a predetermined amount;

wherein the controller commanding the oxidizer system to decrease cathode flow rate when the determined ECI minus two standard deviations is larger than the target ECI; and wherein the controller commanding the oxidizer system to increase cathode flow rate when the determined ECI minus two standard deviations is smaller than the target ECI.

2. The method of claim 1, repeating the steps of the method during operation of the fuel cell to monitor the hydration state of the fuel cell over time.

3. The method of claim 1, wherein the operating conditions include a cathode flow rate through the fuel cell, an anode flow rate through the fuel cell, a temperature of the fuel cell, the current output by the fuel cell, and the voltage across the fuel cell.

4. The method of claim 1, wherein verifying the operating conditions are stable includes verifying that a flow through the cathode is fluctuating less than or equal to about 7%, that an anode fuel pressure is fluctuating less than or equal to about 10%, that a fuel cell stack temperature is fluctuating less than or equal to about 0.2%, that the current output by the fuel cell is fluctuating less than or equal to about 5%, and that the voltage across the fuel cell is fluctuating less than or equal to about 1%.

5. The method of claim 1, wherein perturbing the output from the fuel cell includes commanding a DC/DC converter connected to the fuel cell to change the current output of the fuel cell.

6. The method of claim 1, wherein the ECI is a direct current impedance.

7. The method of claim 1, wherein the ECI is a single-frequency ECI.

8. The method of claim 7, wherein the single-frequency ECI is at a frequency of greater than about 1000 Hz.

9. The method of claim 7, wherein an envelope and a phase of the single-frequency ECI for the fuel cell is measured using an analog circuit connected to the fuel cell.

10. The method of claim 1, wherein the fuel cell is one of a plurality of fuel cells making up a fuel cell stack.

\* \* \* \* \*